United States Patent [19]

McCollum et al.

[11] 4,377,864
[45] Mar. 22, 1983

[54] CHROMIUM (III) ORDERED PEROVSKITE LASERS AND MEDIA THEREFOR

[75] Inventors: Bill C. McCollum, Marlboro; Leonard J. Andrews; Alexander Lempicki, both of Wayland, all of Mass.

[73] Assignee: GTE Laboratories Incorporated, Waltham, Mass.

[21] Appl. No.: 291,664

[22] Filed: Aug. 10, 1981

[51] Int. Cl.$^3$ .............................................. H01S 3/14
[52] U.S. Cl. .................................................. 372/41
[58] Field of Search ....................... 372/39, 41, 42, 53; 252/301.4 P Primary Examiner—William L. Sikes
Assistant Examiner—Leon Scott, Jr.
Attorney, Agent, or Firm—Fred Fisher

[57] ABSTRACT

A laser medium includes an ordered perovskite crystal of the general formula: $A_2B\,Cr_yB'_{1-y}X_6$. A and B are alkali metal ions with the ionic radius of A greater than B. B' is an ion selected from the group consisting of $Y^{3+}$, $La^{3+}$, $Gd^{3+}$, $Lu^{3+}$, $Sc^{3+}$, $Al^{3+}$, $Ga^{3+}$, and $In^{3+}$. X is an ion selected from the group consisting of $F^-$, $Cl^-$, and $Br^-$. A can be an ion selected from the group consisting of $K^+$, $Na^+$, $Cs^+$, and $Rb^+$. B can be an ion selected from the group consisting of $K^{+-}$, $Na^+$, and $Li^+$. The chromium can be represented by $Cr^{+3}$ ions. The laser media can be ordered perovskite polycrystalline compounds of the formulae: $CsNaCr_{0.01}Y_{0.99}Cl_6$; $KLi\,Cr_ySc_{1-y}F_6$ (where y equals 0.01 and 0.10); $K_2Na\text{-}Cr_ySc_{1-y}F_6$ (where $0.01 \leq y \leq 0.40$).

A laser can include an optical resonant cavity defined by a first totally reflective mirror and a second partially transmissive mirror. Within the cavity is an active laser medium comprising an ordered perovskite crystal of the general formula stated above, and may be of a specific formula as stated above. An optical pumping means is disposed adjacent to the optical cavity for exciting the laser medium to stimulated radiation. The mirrors are provided with reflective coatings on opposite surfaces of the active laser medium.

15 Claims, 4 Drawing Figures

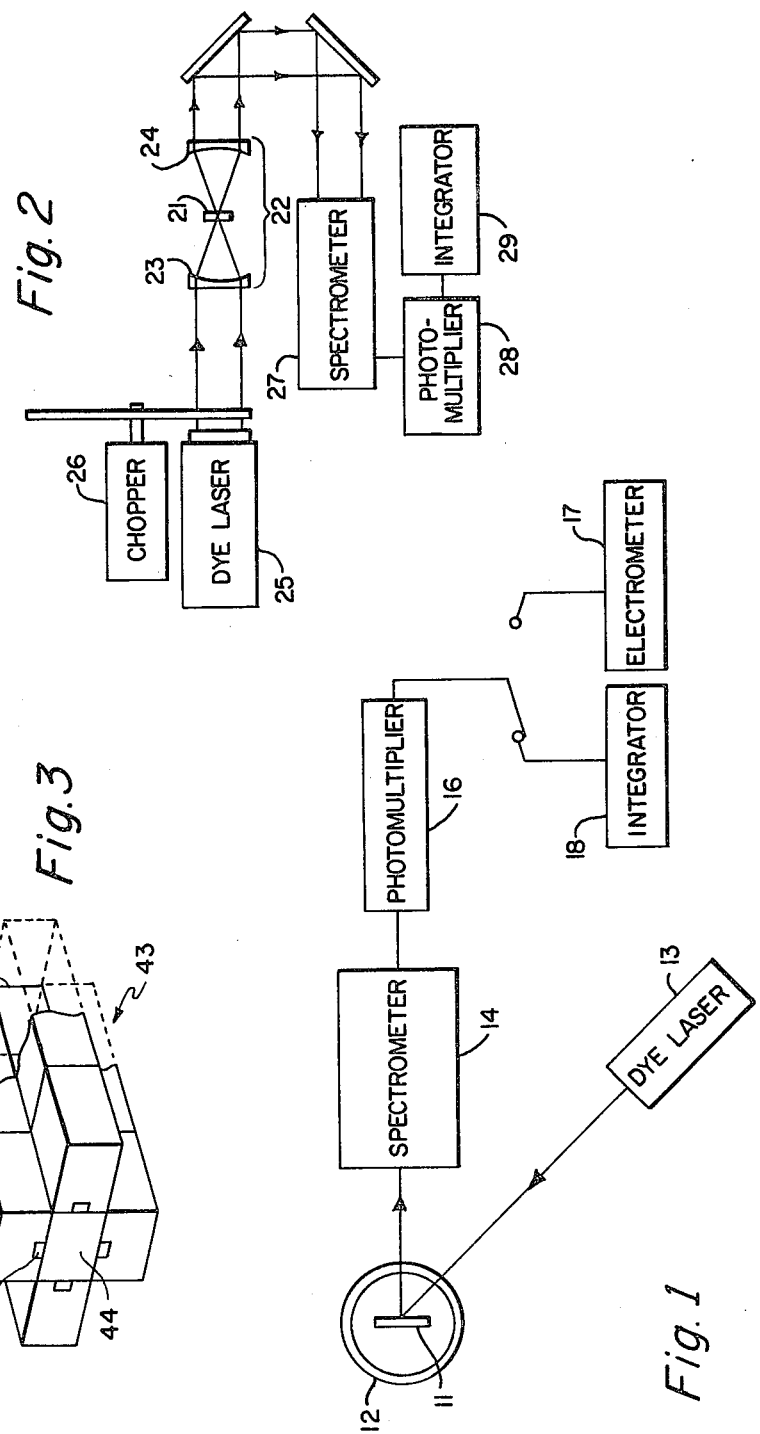

CHROMIUM (III) ORDERED PEROVSKITE LASERS AND MEDIA THEREFOR

BACKGROUND OF THE INVENTION

1. Field of the Invention

This invention relates to solid state tunable lasers, and, in particular, to chromium (III) ordered perovskite lasers and media therefor. Accordingly, it is a general object of this invention to provide new and improved lasers and media of such character.

2. Description of the Prior Art

The class of tunable solid state lasers, which are based on vibronic transitions (i.e., involving both electronic and vibrational changes of state) in metal ions, are of interest. With the exception of chromium in alexandrite, it is believed that the majority of such lasers were discovered some 15 years ago.

"Phonon Terminated Optical Masers", by L. F. Johnson, H. J. Guggenheim, and R. A. Thomas, *Phys. Rev.* 149, 179 (1966) sets forth a summary of characteristics of phonon-terminated optical masers in Table I thereof, including active ion $Ni^{2+}$ with hosts $MgF_2$, $MnF_2$, and $MgO$, active ion $Co^{2+}$ with hosts $MgF_2$, $ZnF_2$, and $KMgF_3$, and active ion $V^{2+}$ with host $MgF_2$. These sources, which provide radiation in the red and near-infrared portion of the spectrum have been "rediscovered" in the past few years. Still, the lasing ions ($Ni^{2+}$, $Co^{2+}$, $V^{2+}$) and the hosts ($MgF_2$, $MgO$, $KMgF_3$) have remained exactly the same as in 1966. All of them operate only at cryogenic temperatures.

A laser based on chromium in alexandrite ($BeAl_2O_4$) has been described in a paper entitled "Tunable Alexandrite Lasers" by John C. Walling et al., *IEEE Journal of Quantum Electronics*, Vol. QE-16, No. 12, December 1980, pp. 1302–1315. Also of interest is U.S. Pat. No. 3,997,853, issued Dec. 14, 1976 for "Chromium-Doped Beryllium Aluminate Lasers".

The amount of chromium which can be accepted as a dopant by alexandrite is about 0.3 wt%. When more chromium is used with alexandrite, the efficiency of the device degrades.

There are several significant characteristics of alexandrite: (1) It is a hybrid material with the $Cr^{3+}$ $^2E$ and $^4T_2$ electronic states at almost the same energy, the $^4T_2$ being only thermally populated and being above $^2E$, thereby leading to low emission cross-sections from the $^4T_2$. (2) There are two crystallographic sites for chromium, only one of which is active in the laser (thereby reducing by fifty percent the effective concentration of the active ion). (3) It undergoes severe concentration of quenching above about 0.3 wt% doping.

A known class of fluidic tunable lasers include so-called dye lasers. Dye lasers, tunable in the visible spectrum, are useful and effective, but have limited commercial applications. They are not susceptible to Q-switched operation. Since dyes are in a liquid medium (usually alcohol, a typical solvent), they undergo photodegradation, and have to be periodically replaced.

The few different types of solid state lasers, known in the art, are believed to produce essentially single frequency light. Neodymium (infrared) and ruby (visible) are single frequency devices; they are not tunable. A known class of solid state lasers includes so-called F center lasers. These lasers, as a class, are collectively tunable in the region 0.7 μm to 3.5 μm. Although these devices are solid state, the active media frequently must be stored at cryogenic temperatures and they can be operated only at cryogenic temperature. Also, like organic dyes lasers, they cannot effectively be operated in a Q-switched mode.

SUMMARY OF THE INVENTION

Another object of this invention is to provide new and improved solid state tunable lasers which are operable in the near infrared (0.7 μm to 1.2 μm).

Still another object of this invention is to provide new and improved lasers of such character which can be optically pumped and operated pulsed (Q-switched) as well as cw.

Still yet another object of this invention is to provide new and improved laser materials which contain $Cr^{3+}$ as the active ion and are characterized by a low ligand field to insure broadband vibronic transitions.

In accordance with one embodiment of the invention, a laser medium includes an ordered perovskite crystal of the general formula: $A_2BCr_yB'_{1-y}X_6$ where A and B are alkali metal ions with the ionic radius of A greater than B. In accordance with one feature of the invention, X is an ion consisting of $F^-$. A can be $K^+$, $Na^+$; B can be $Na^+$, $Li^+$; B' can be $Sc^{3+}$, $Al^{3+}$, $Ga^{3+}$, $In^{3+}$. (The selections are such that the ionic radius of A is greater than B). In accordance with other features of the invention, X is an ion selected from the group consisting $Cl^-$, $Br^-$. A can be $Cs^+$, $Rb^+$; B can be $K^+$, $Na^+$, $Li^+$; B' can be $Y^{3+}$, $La^{3+}$, $Gd^{3+}$, $Lu^{3+}$, $Sc^{3+}$, $Al^{3+}$, $Ga^{3+}$, $In^{3+}$. The laser media can include $Cs_2NaCr_{0.01}Y_{0.99}Cl_6$; it can include $K_2NaCr_ySc_{1-y}F_6$ ($0.01 \leq y \leq 0.40$); and it can include $K_2LiCr_ySc_{1-y}F_6$ ($y = 0.01$ and $0.10$).

In accordance with another embodiment of the invention, a laser includes an optical resonance cavity defined by a first totally reflective mirror and a second partially transmissive mirror. Within the cavity is an active laser medium comprising an ordered perovskite crystal of the general formula $A_2BCr_yB'_{1-y}X_6$ where A and B are alkali metal ions with the ionic radius of A greater than B; B' is an ion selected from the group consisting of $Y^{3+}$, $La^{3+}$, $Gd^{3+}$, $Lu^{3+}$, $Sc^{3+}$, $Al^{3+}$, $Ga^{3+}$, and $In^{3+}$; and X is an ion selected from the group consisting of $F^-$, $Cl^-$ and $Br^-$. An optical pumping means is disposed adjacent to the optical cavity for exciting the laser medium to emit stimulated radiation. The chromium is represented by $Cr^{+3}$ ions. A can be potassium, sodium, cesium, and rubidium. B can be potassium, sodium and lithium. In accordance with certain features of the invention, the active laser media can be ordered perovskite polycrystalline compounds of the formulae $K_2LiCr_{0.05}Sc_{0.95}F_6$, $K_2LiCr_{0.1}Sc_{0.1}F_6$, and $K_2NaCr_{0.05}Sc_{0.95}F_6$. The cavity can include reflective coatings on opposite surfaces of the active laser medium.

There are several significant characteristics of the ordered perovskite materials of this invention: (1) The ordered perovskite material is a low ligand field material with the $Cr^{3+}$ $^4T_2$ electronic state energetically lower than $^2E$ electronic state. (2) In ordered perovskites, there is but a single, unique crystallographic site for chromium. (3) The ordered perovskite in accordance with the invention can be grown to very high concentration levels of chromium, an order of magnitude or more than alexandrite, and still not suffer any efficiency degradation. (4) The ordered pervoskite in accordance with the invention can be coarsely tuned by changing the chemical nature of the perovskite. Thus, with this invention, a class of materials is obtained in which the chemical nature of the perovskite can be changed substantially so that the wavelength of the emission can be coarsely changed over a wide range.

BRIEF DESCRIPTION OF THE DRAWING

Other objects, advantages, and features of this invention, together with its construction and mode of operation, will become more apparent from the following description, when read in conjunction with the accompanying drawing, in which:

FIG. 1 is a schematic representation of the experimental arrangement employed to determine the spectroscopic properties of laser media according to the present invention;

FIG. 2 is a schematic representation of the experimental arrangement employed to determine the laser properties of laser media according to the present invention;

FIG. 3 is a schematic representation of a laser according to the present invention.

DESCRIPTION OF PREFERRED EMBODIMENTS

Figure 4:
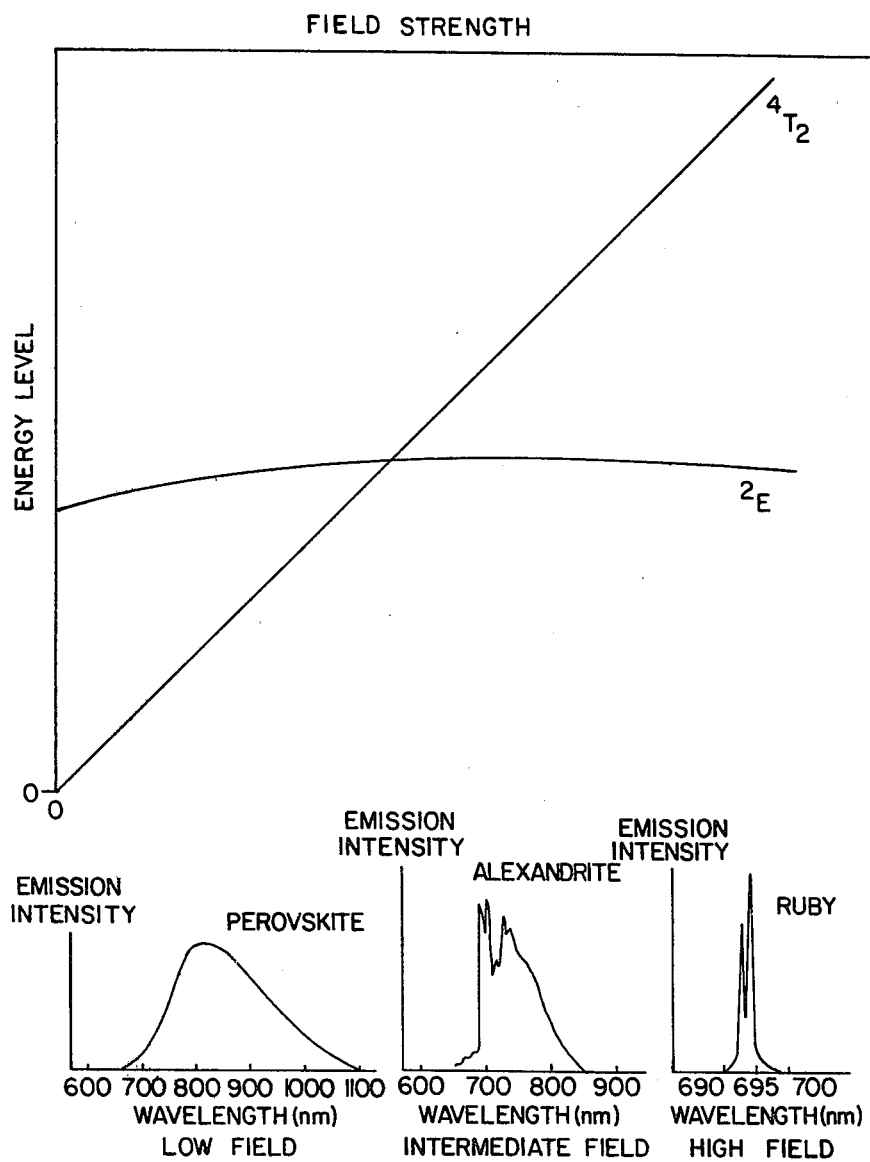
FIG. 4 is a diagram illustrating $Cr^{3+}(3d^3)$ energy levels as a function of the field for low field crystals (such as perovskites), alexandrite, and ruby.

The use of chromium as a dopant for ordered perovskite crystals does not require low temperature for operation in the 0.7 $\mu$m to 1.2 $\mu$m range. Especially, the broadband fluorescence of $Cr^{3+}$ ions in ordered perovskite crystals of the general formula $A_2BCr_yB'_{1-y}X_6$ serves as a basis for a four level solid state laser tunable over the wavelength range 0.7 $\mu$m to 1.2 $\mu$m. A and B are alkali metal ions with the ionic radius of A greater than B. With X being an ion consisting of $F^-$, A can be $K^+$ or $Na^+$, B can be $Na^+$ or $Li^+$, and B' can be $Sc^{3+}$, $Al^{3+}$, $Ga^{3+}$, or $In^{3+}$. With X being an ion selected from the group consisting $Cl^-$ and $Br^-$, A can be $Cs^+$ or $Rb^+$; B can be $K^+$, $Na^+$, or $Li^+$; and B' can be $Y^{3+}$, $La^{3+}$, $Gd^{3+}$, $Lu^{3+}$, $Sc^{3+}$, $Al^{3+}$, $Ga^{3+}$, or $In^{3+}$. The laser media can include $Cs_2NaCr_{0.01}Y_{0.99}Cl_6$; $K_2NaCr_ySc_{1-y}F_6$ ($0.01 \leq y \leq 0.40$); and $K_2LiCr_ySc_{1-y}F_6$ (y=0.01 and 0.10). When excited with a nanosecond pulsed dye laser, the latter two compounds have exponentially decaying fluorescence with lifetimes of 250 and 350 $\mu$s, respectively (y=0.01). The fluorescence spectra are centered near 750 nm and have a 95 nm width at half height.

With d-electrons, energy levels are split in a ligand field. Depending on its strength (i.e., the nature of the surrounding ion), the splitting can be quite small or quite large. Chromium, however, is a special case in that, depending upon the magnitude of such splitting, either of two levels can be the lowest excited state. As a result, there are two different types of luminescence for chromium. In ruby, a high field material, luminescence occurs in a narrow band from a $^2E$ state to the ground state. In perovskite halides, predominantly low field materials, luminescence occurs from a $^4T_2$ state, and are broad in nature, covering a wider range of the spectrum, out into the infrared, from 700 to 1200 nanometers.

An ordered perovskite was chosen, based upon potassium fluoride, lithium fluoride, chromium trifluoride, and scandium trifluoride as components. The ordered perovskite was produced in such a manner that the components would provide the proper stoichiometry for the ordered perovskite, that is $K_2LiSc_{1-y}Cr_yF_6$. The ingredients were mixed together and placed into a closed platinum tube so that no ingredients could escape. The ingredients were then heated to a temperature sufficient to melt the material (about 1000° C.), and permitted to cool, resulting in a polycrystalline mass. The luminescence of that polycrystalline perovskite, in accordance with the invention, was quite strong.

A single crystal ordered perovskite was produced of potassium sodium scandium chromium fluoride ($K_2NaSc_{1-y}Cr_yF_6$, y=0.01, 0.05, 0.10, 0.25, and 0.40).

By the broad banded nature of the $Cr^{3+}$ ordered perovskite laser materials produced in accordance with the invention, a wide frequency spectrum is obtained. The spectrum can be shifted by changing the hose (i.e., the particular crystal) containing the $Cr^{3+}$ and by tuning with insertion of dispersive elements into the laser cavities.

The lifetime of the chromium in ordered perovskites is several hundred microseconds. Thus, it should be relatively easy to pump the perovskite laser with incoherent sources such as flashlamps. The ordered perovskite crystals store the energy, and emit energy by Q-switched operation. Q-switch operation requires a long radiative lifetime, and is effective with ruby and neodymium, but is ineffective with tunable dye lasers because laser dyes exhibit nanosecond radiative lifetimes.

The chromium (III) ordered perovskite laser media, produced in accordance with this invention, does not suffer from concentration quenching. That is, substantial quantities of chromium can be doped into the perovskite crystalline material and the resultant luminescent efficiency does not become degraded (or degradation occurs at a very slow pace). Contrariwise, ruby and alexandrite laser media suffer from concentration quenching at low $Cr^{3+}$ concentrations.

The emission spectrum and luminescence decay times of the $Cr^{3+}$ ordered perovskite laser materials according to the present invention can be experimentally determined using the apparatus schematically represented in FIG. 1. A polycrystalline sample 11 of $Cr^{3+}$ ordered perovskite material, placed in a Dewar flask 12, is excited by a tunable coumarin 120 dye laser 13. The light emitted by the sample 11 is then passed through a ¾ meter Czerny-Turner spectrometer 14 (Jarrell-Ash Div., Fisher Scientific Co., 590 Lincoln Street, Waltham, MA 02254), to a Varian model VPM-159A cooled photomultiplier 16 (Varian Instrument Division, 611 Hansen Way, Palo Alto, CA 94303). The emission spectrum of the excited sample 11 is measured using an electrometer 17. Alternatively, the output of photomultiplier 16 can be connected to a boxcar integrator 18 (Princeton Applied Research Corp., P.O. Box. 2565, Princeton, N.J. 08540) to measure the luminescence decay times of the excited sample 11, under conditions of pulsed excitation by dye laser 13.

Laser emission is obtained using the apparatus represented schematically in FIG. 2. A small crystal 21, measuring about 0.3 mm×0.3 mm×0.1 mm, is mounted at the laser mode waist of a nearly concentric 10 cm optical cavity 22 of a laser. The optical cavity 22 is defined by a first spherical mirror 23 and a second spherical mirror 24. The mirror 23 is transparent to the pump radiation wavelength of 648 nanometers. The mirror 23 is totally reflective to the laser emission wavelengths, and the mirror 24 transmits approximately 0.2 percent of the laser emission wavelengths.

The crystal 21 is collinearly pumped by means of a tunable dye laser 25 which is chopped by a rotating chopper 26 to produce 500 millisecond pulses. The laser output is passed through a ¾ meter Czerny-Turner spectrometer 27 to a photomultiplier 28. The photomultiplier 28 output is measured using a PAR boxcar integrator 29.

With relatively long spontaneous fluorescent lifetimes, laser media according to the present invention are useful as miniature pulsed laser devices. Q-switched operation of such laser devices is enhanced by efficient energy storage therein.

Tunable solid state lasers can be constructed according to the present invention by placing a single crystal of a chromium (III) ordered perovskite material of the formula $A_2BCr_yB'_{1-y}X_6$ in an optical resonating cavity defined by a first totally reflective mirror and a second mirror partially transmissive to the laser emission wavelength.

In the laser medium, A and B are alkali metal ions with the ionic radius of A greater than B. B' is an ion selected from the group consisting of $Sc^{3+}$, $Al^{3+}$, and $Ga^{3+}$. X is an ion selected from the group consisting $Cl^-$ and $F^-$. (A can be potassium; B can be lithium or sodium, by way of example).

The value of y can vary with higher values of y being preferred to maximize the concentration of the chromium ion in the lasing medium. Desirable laser media, in accordance with this invention, include $Cs_2NaCr_{0.01}Y_{0.99}Cl_6$; $K_2NaCr_ySc_{1-y}F_6$ where $0.01 \leq y \leq 0.40$; and $K_2LiCr_ySc_{1-y}F_6$ where $y = 0.01$ and $0.10$.

A single crystal 41 of laser material, according to one embodiment of the present invention shown in FIG. 3, is provided with a first totally reflective mirror 42 formed by coating an end of the crystal which is perpendicular to the lasing axis to produce the laser 43. A second partially transmissive mirror 44 is formed by coating the crystal face which opposes the first surface mirror 42. An array of light emitting diodes or laser diodes 46 are positioned adjacent to the crystal in such a way that the light emitting junction 47 of each diode is in good optical contact with the crystal 41 and aligned parallel to the crystal lasing axis. For simplicity, in FIG. 3, the electrical connections to each light emitting diode and the associated electrical circuitry required for energization of the light emitting diodes are not shown.

A Q-switched laser, using a laser medium of the present invention, comprises such laser medium, disposed in an optical cavity formed by a first totally reflective mirror and a second partially reflective mirror, and an optical pumping means for exciting the medium to emit stimulated radiation, and a Q-switch means disposed in the optical cavity for interrupting the optical energy beam in the cavity.

FIG. 4 is a diagram illustrating energy levels as a function of a field for perovskites, alexandrite, and ruby. Perovskites have a broad bandwidth with the $^4T_2$ level lower than the $^2E$ state. Ruby has a narrow bandwidth with the $^4T_2$ level higher than the $^2E$ state. For some crystals, such as alexandrite, the $Cr^{3+}$ $^4T_2$ level approximates the $^2E$ state with a broad band that has a peak superimposed thereupon. Thus, for perovskites and alexandrite, one can coarsely change the wavelength of the emission over a wide range.

Thus, the major advantages of this invention include: (1) the laser materials are solids, (2) the laser materials have broadbanded emission, and (3) the laser materials have a low (a near absence of) concentration quenching.

As the material is doped with increasing quantities of chromium, the efficiency of the luminescence $$\left( \frac{\text{photons emitted}}{\text{photons pumped}} \right)$$

remains relatively constant. Thus, it is a slow function of chromium concentration. In contrast, concentration quenching is a much more severe problem with chromium in many other solid state materials.

Chromium doped perovskite materials suffer from lower absorption than many other materials. Because they are cubic, the absorption is generally less due to a lower transition probability. Therefore, in comparison with other materials, such as chromium in alexandrite, chromium ordered perovskite crystals may suffer from the reduced ability of being efficiently pumped. A rather high absorption is desired for efficient pumping; however, for perovskites, it is known that there is only a single site for chromium, and, also, they can be doped to a relatively high extent (e.g., higher than alexandrite). In perovskites, 10%, 20%, and even higher amounts of chromium can be substituted therewithin. In its extreme, stoichiometric material containing 100% chromium has been made; however, though it is visible, and there is luminescence from it, it does not fluoresce very strongly.

Although the absorption constant for a particular concentration of ordered perovskite material is lower than that of alexandrite, the fact that the perovskite material can be highly doped with chromium makes the total absorption of the perovskite material comparable to alexandrite, with at least an order of magnitude more energy stored therein.

In general, when dealing with a broad band emission material, and, in applications when it is desired to amplify the emission from one laser in a chain, sometimes involving several amplifiers, it is desired to match the frequencies of the original oscillator with subsequent amplifiers. By practicing this invention, the oscillator can be narrow band; it can be made of different material than the amplifiers. The amplifiers, being broad banded, are not subject to any limitation concerning the match of the wavelengths of the amplifier to that of the oscillator. Thus, a new degree of freedom is provided in designing a system which can involve one material for the oscillator and different materials for amplifiers which are broad banded.

Lasers based on chromium are characterized by homogeneous broadening. The band widths of such lasers are due to the characteristic that essentially every ion in the host crystal contributes the same amount of breadth towards the total emission. As a consequence, when a signal arrives from a laser oscillator, it can extract all of the energy from all of the ions in the amplifier. For glasses, this is not the case, because glasses are disordered. The width of the emission in glass is the sum total of individual widths contributed by each and every ion in the glass. Therefore, there are sub-populations of ions which have slightly different characteristics. With a signal directed into a neodymium or rare earth doped glass laser, only that portion of the energy which resides in ions being in tune at the same frequency as the original signal can be extracted. This is different in the vibronic transitions which are characteristics of the chromium in these materials.

While there has been shown and described what is at present considered to be the preferred embodiments of the invention, it will be apparent to those skilled in the art that various changes and modifications may be made without departing from the spirit and scope of the invention.

What is claimed is:

1. A laser medium comprising an ordered perovskite crystal of the general formula:

$$A_2BCr_yB'_{1-y}X_6$$

where A and B are alkali metal ions with an ionic radius of A greater than B; B' is an ion selected from the group consisting of $Y^{3+}$, $La^{3+}$, $Gd^{3+}$, $Lu^{3+}$, $Sc^{3+}$, $Al^{3+}$, $Ga^{3+}$, and $In^{3+}$; and X is an ion selected from the group consisting of $F^-$, $Cl^-$ and $Br^-$.

2. The lasers medium as recited in claim 1 wherein A is an ion selected from the group consisting of $K^+$, $Na^+$, $Cs^+$, and $Rb^+$; and B is an ion selected from the group consisting of $K^+$, $Na^+$, and $Li^+$.

3. The laser medium as recited in claim 1 wherein the chromium is represented by $Cr^{+3}$ ions.

4. The laser medium as recited in claim 1 wherein A is potassium.

5. The laser medium as recited in claim 1 wherein B is lithium.

6. The laser medium as recited in claim 1 wherein B is sodium.

7. A laser medium comprising an ordered perovskite polycrystalline compound of the formula:

$$Cs_2NaCr_{0.01}Y_{0.99}Cl_6.$$

8. A laser medium comprising an ordered perovskite polycrystalline compound of the formula:

$K_2LiCr_ySc_{1-y}F_6$, where y=0.01 and 0.10.

9. A laser medium comprising an ordered perovskite polycrystalline compound of the formula:

$K_2NaCr_ySc_{1-y}F_6$, where $0.01 \leq y \leq 0.40$.

10. A laser comprising in combination:
an optical resonance cavity defined by a first totally reflective mirror and a second partially transmissive mirror,
an active laser medium within said cavity, said medium comprising an ordered perovskite crystal of the general formula:

$$A_2BCr_yB'_{1-y}X_6$$

where A and B are alkali metal ions with the ionic radius of A greater than B; B' is an ion selected from the group consisting of $Y^{3+}$, $La^{3+}$, $Gd^{3+}$, $Lu^{3+}$, $Sc^{3+}$, $Al^{3+}$, $Ga^{3+}$, and $In^{3+}$; and X is an ion selected from the group consisting of $F^-$, $Cl^-$, and $Br^-$, and
an optical pumping means disposed adjacent to said optical cavity for exciting said laser medium to emit stimulated radiation,
wherein chromium is represented by $Cr^{3+}$ ions,
wherein A is an ion selected from the group consisting of potassium, sodium, cesium, and rubidium; and B is selected from the group consisting of potassium, sodium, and lithium.

11. The laser as recited in claim 10 where said active laser medium is an ordered perovskite polycrystalline compound of the formula $Cs_2NaCr_{0.01}Y_{0.99}Cl_6$.

12. The laser as recited in claim 10 wherein said active laser medium is an ordered perovskite polycrystalline compound of the formula $K_2LiCr_ySc_{1-y}F_6$, where y=0.01 and 0.10.

13. The laser as recited in claim 10 wherein said active laser medium is an ordered perovskite polycrystalline compound of the formula $K_2NaCr_ySc_{1-y}F_6$, where $0.01 \leq y \leq 0.40$.

14. The laser as recited in claim 10 wherein said optical pumping means comprises at least one light emitting diode.

15. The laser as recited in claim 10 wherein said first totally reflective mirror and said second partially transmissive mirror comprises reflective coatings on opposite surfaces of said active laser medium.

* * * * *